Jan. 11, 1938.  I. D. RICHHEIMER  2,105,201
LOCKING COVER FOR POTS
Filed March 2, 1936

INVENTOR
Isaac D. Richheimer,
BY
Harry B. Cook,
ATTORNEY

Patented Jan. 11, 1938

2,105,201

UNITED STATES PATENT OFFICE 2,105,201

LOCKING COVER FOR POTS

Isaac D. Richheimer, New York, N. Y.

Application March 2, 1936, Serial No. 66,636

1 Claim. (Cl. 53—3)

This invention relates in general to pots having separable covers, more particularly to coffee pots, tea pots and the like formed of breakable material such as china, earthenware or porcelain.

It is well known that in the handling of particularly coffee pots and tea pots in pouring therefrom, there generally is danger of the cover of the pot accidentally falling from the pot due to tilting of the latter, and breakage of the cover frequently results. However, it is desirable that the covers of such pots be easily and quickly attachable to and separable from the pots without complex fastening means. Moreover, where the pots are formed of breakable material, it is extremely difficult to provide fastening means which will withstand the stocks and jars incident to use of the pots and covers.

Therefore, one object of my invention is to provide a pot having a novel and improved locking cover whereby the pot and cover shall be strong and durable and the cover can be locked upon the pot against accidental falling therefrom during tilting of the pot.

Other objects are to provide such a pot and cover which shall include a novel and improved construction and combination of a cover seat on the pot and a skirt and locking lugs on the cover to cooperate with the seat on the pot for supporting and locking the cover on the pot; to provide a novel and improved construction of pot cover including a depending skirt and locking lugs whereby the lugs and skirt shall mutually reenforce each other to withstand shocks and jars incident to application and removal of the cover to and from the pot, and to obtain other advantages and results as will be brought out by the following description.

Referring to the accompanying drawing in which corresponding and like parts are designated throughout the several views by the same reference characters.

Figure 1:
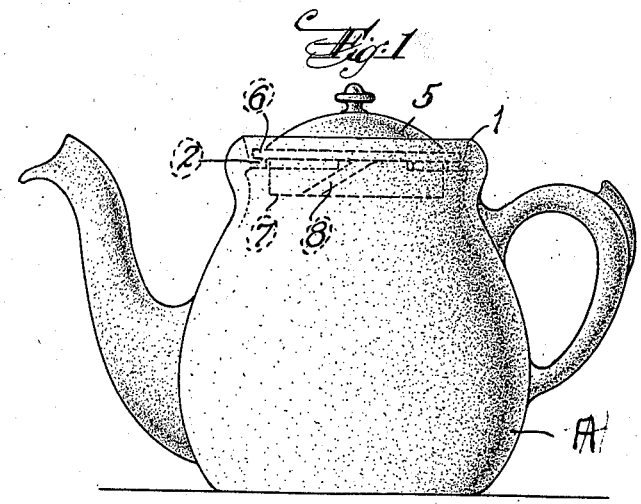
Figure 1 is a side elevation of a pot having a locking cover embodying my invention.

Specifically describing the invention, the reference character A designates the body of the pot which may be formed of any suitable material, but generally is composed of china, porcelain or earthenware. The pot has a circular mouth at its top which is surrounded by a rim 1, and inwardly of the rim is a cover seat 2 preferably formed integrally with the pot. The cover seat is formed at diametrically opposite points with transverse notches 3, and the top and bottom of the cover seat are in planes approximately parallel with the plane of the rim 1. As shown, the cover seat comprises two arcuate ribs 4 which project inwardly from the inner walls of the pot with their ends spaced apart at diametrically opposite sides of the pot to form the notches 3.

Figure 2:
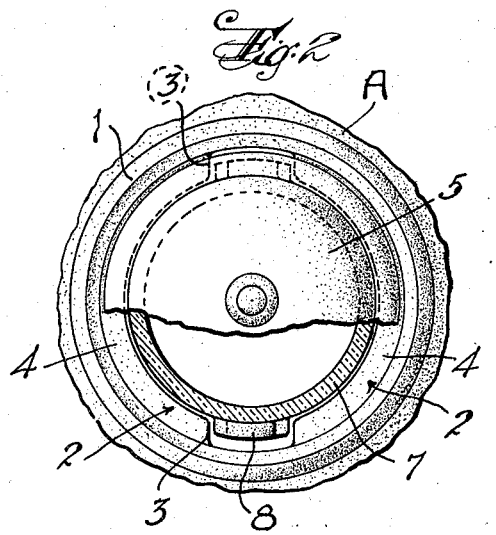
Figure 2 is a fragmentary top plan view thereof with portions of the cover broken away and showing the cover in unlocked position.
Figure 3:
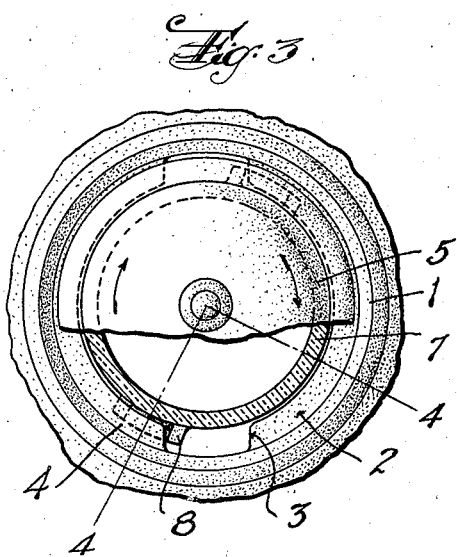
Figure 3 is a similar view showing the cover locked.
Figure 4:
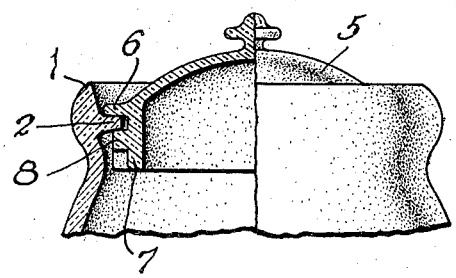
Figure 4 is a composite vertical sectional and side elevational view on the line 4—4 of Figure 3.
Figure 5:
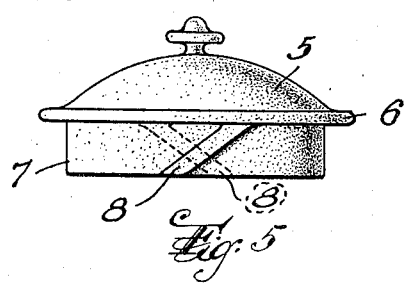
Figure 5 is a detached side elevational view of the cover.

The pot is provided with a separable cover 5 which has a perimetral flange 6 to seat upon the top side of the cover seat or ribs 4, and the cover has a depending cylindrical skirt 7 extending inwardly of the pot from said flange 6 beyond the cover seat or ribs 4. Preferably the skirt 7 is integral with the cover, and has preferably integral locking lugs 8 projecting from the outer side thereof and extending in the same composite circumferential longitudinal direction relative to the skirt, the length of the lugs being such that they may pass between the ends of the ribs 4 or through the notches 3 as shown in Figure 2, as the cover is set on the cover seat or ribs. Upon rotation of the cover, the lugs will engage the underside of the cover seat or the bottom sides of the ribs to lock the cover against accidentally falling from the pot when the latter is tilted, as shown in Figures 1, 3 and 4, and the inclined lugs engaging the ends of the ribs cause the cover to be drawn with a wedging action tightly against the ribs 4 as the cover is rotated to lock it on the pot, so as to securely hold the cover in position and retain the hot vapors in the pot.

The lugs 8 extend the full length of the skirt, merging at one end into the flange 6, and the lugs, flange and skirt mutually reenforce each other at the points of application of strains and blows thereon during application and removal of the cover to and from the pot. This permits the cover to be made light in weight which is desirable for low cost of manufacture, ease in handling, and reducing possibility of damage to the rim of the pot from dropping or careless application of the cover upon the pot, and also enables use of the skirt to facilitate dripping of condensed moisture from the cover into the pot to ensure against such dripping upon a table or the like when the cover is removed. The composite circumferential and longitudinal inclination of the lugs relative to the skirt and the extension of the lugs from the flange 6 insure easy locking of the cover and provide strong and simple stops for limiting rotation of the cover; the ends of the ribs will be abutted by the lugs as the cover is rotated into locking position.

The invention therefore provides a strong and simple structure which is particularly important in pots and covers formed of breakable material so as to reduce the possibility of breaking off of the ribs 4, the lugs 8 and the edges of the skirt 7.

Various modifications of the construction will occur to those skilled in the art as within the scope of the invention, the preferred form being illustrated primarily for the purpose of explaining the principles of the invention.

Having thus described my invention, what I claim is:

A pot having a circular mouth with a rim and arcuate ribs spaced inwardly from said rim and projecting integrally from the inner walls of the pot with flat top and bottom sides in planes approximately parallel with the plane of said rim and with their ends spaced apart at diametrically opposite sides of the pot, and a cover having a perimetral flange resting on the top side of said ribs, an integral depending cylindrical skirt on said cover extending inwardly of the pot from said flange beyond said ribs, and diametrically opposite lugs projecting integrally from the outer side of said skirt and inclined in the same composite circumferential and longitudinal direction relative to said skirt and merging at one end into said flange on the cover, whereby said lugs may pass between the ends of said ribs as the cover is set on said ribs and upon rotation of said cover said lugs will engage with a wedge action the bottom sides of said ribs to lock the cover against accidentally falling from the pot when the latter is tilted, said skirt, flange and lugs mutually reenforcing each other at the points of application of strains and blows thereon during application and removal of the cover to and from the pot.

ISAAC D. RICHHEIMER.